United States Patent [19]

Rinkleib et al.

[11] Patent Number: 4,608,614
[45] Date of Patent: Aug. 26, 1986

[54] APPARATUS FOR THREADING MAGNETIC TAPE IN A MAGNETIC TAPE TRANSPORT

[75] Inventors: Helfried O. Rinkleib; William J. Rueger, Tucson, both of Ariz.

[73] Assignee: International Business Machines Corp., Armonk, N.Y.

[21] Appl. No.: 507,629

[22] Filed: Jun. 24, 1983

[51] Int. Cl.[4] .................. G11B 15/00; G11B 15/32
[52] U.S. Cl. ..................................... 360/95; 360/88; 242/195
[58] Field of Search ................. 360/95, 93, 88, 90; 242/195, 76

[56] References Cited

U.S. PATENT DOCUMENTS

| | | | |
|---|---|---|---|
| 3,598,926 | 8/1971 | Umeda | 179/100.2 |
| 3,807,652 | 4/1974 | Kruhn et al. | 242/195 |
| 3,848,263 | 11/1974 | Nagaoka | 360/83 |
| 3,934,840 | 1/1976 | Inaga | 242/195 |
| 4,335,858 | 6/1982 | Cramna | 242/195 |
| 4,426,047 | 1/1984 | Richard et al. | 242/195 |
| 4,432,508 | 2/1984 | Inoue et al. | 360/95 |
| 4,452,406 | 6/1984 | Richard | 360/95 |
| 4,477,851 | 10/1984 | Dalziel et al. | 360/95 |

OTHER PUBLICATIONS

P. R. Bareman, P. Y. Hu and A. J. Radmon, Tape Drive Threading Mechanism, Jun. 1982, pp. 441–443.

Primary Examiner—John H. Wolff
Assistant Examiner—Andrew L. Sniezek
Attorney, Agent, or Firm—Pollock, Vande Sande & Priddy

[57] ABSTRACT

Apparatus for threading cartridge magnetic tape over a predetermined data processing path to a takeup reel. A cam track is provided in a cover over the path. The track has a beginning point for positioning a longitudinal cam member into engagement with a leader block exposed through an opening in the cartridge. The track terminates over the takeup reel rotational axis. A bifurcated linkage member is connected at one end to said longitudinal cam member, and to a drive motor. Rotation of the linkage member positions the longitudinal cam member between ends of the track engaging the leader block and threading it through the path and into a slot on the takeup reel.

3 Claims, 8 Drawing Figures

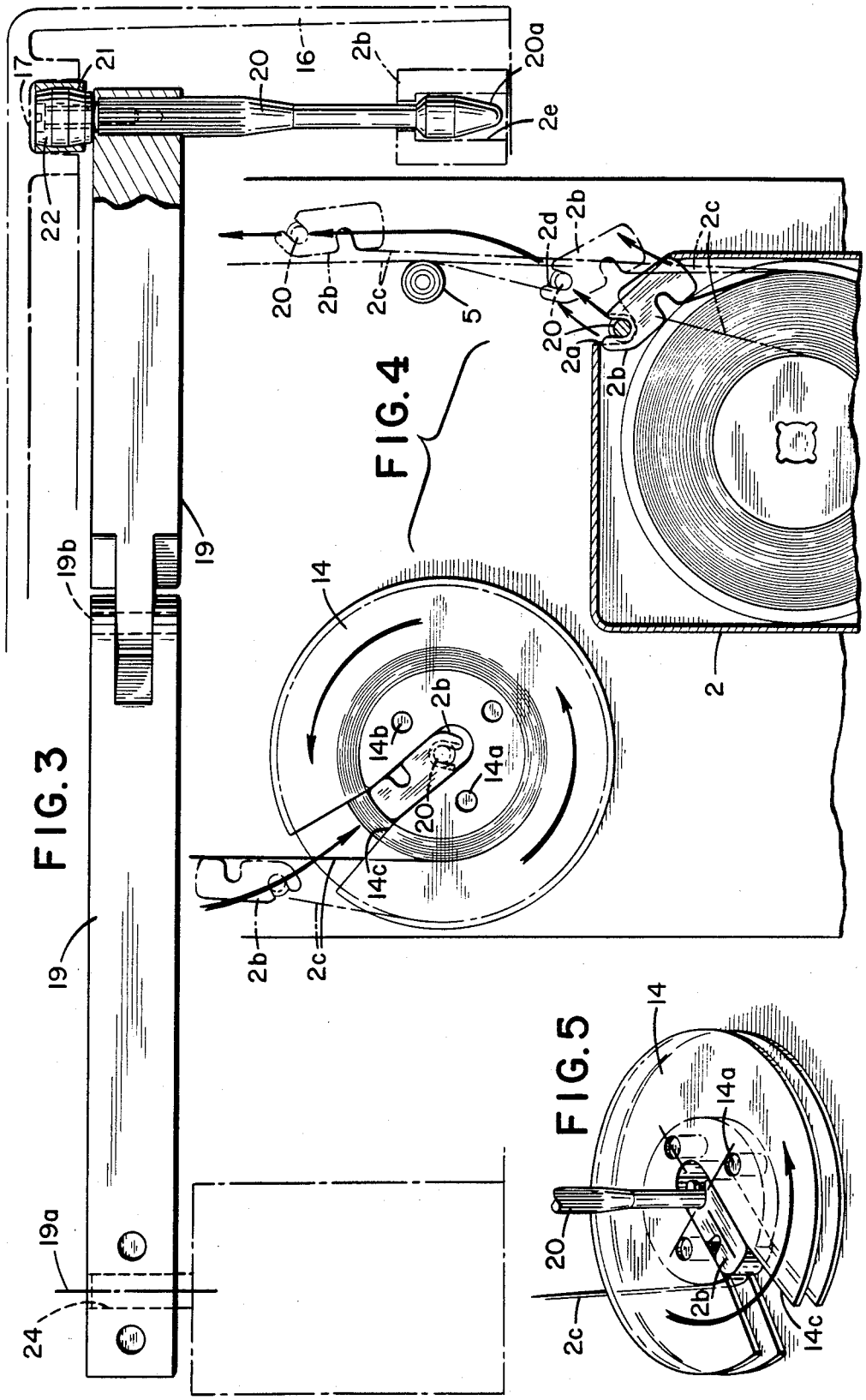

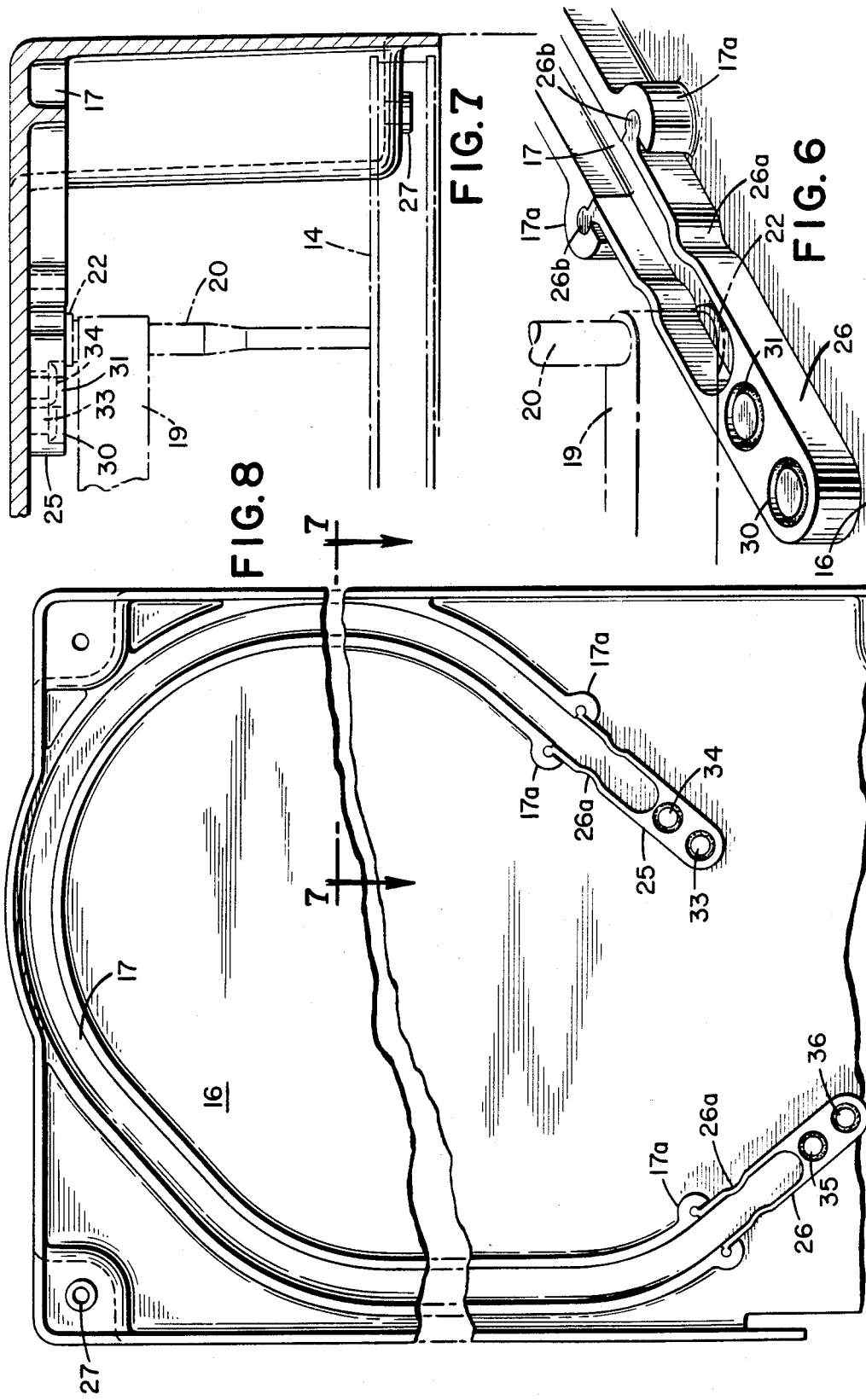

APPARATUS FOR THREADING MAGNETIC TAPE IN A MAGNETIC TAPE TRANSPORT

BACKGROUND OF THE INVENTION

The present invention relates to data processing tape drive systems. Specifically, apparatus for threading a cartridge tape over a READ/WRITE data processing path to a takeup reel is described.

In magnetic tape transport systems, various arrangements are suggested for threading the leading edge of a magnetic tape through a tape path which terminates in a takeup reel. Such arrangements are described in U.S. Pat. Nos. 4,334,656 and 4,335,858. Mechanisms proposed in the aforesaid patents provide for automatic coupling of the tape to a takeup reel and decoupling, whereby the leader block on the end of the magnetic tape is returned to the cartridge, permitting its removal.

In all of these devices, it has been found that tracked threading mechanisms for threading the tape over its path provide for more reliable operation for a complex path. Tracked threading mechanisms have been more costly than alternative threading mechanisms. The present invention is yet another of the tracked devices but one which is less costly than those of the prior art.

It is also desirable in the tracked threading mechanisms to provide linkage systems for moving the threading arm which require only a minimum amount of torque, reducing the size of the required driving motor.

SUMMARY OF THE INVENTION

It is a primary object of this invention to provide a threading apparatus for magnetic tape cartridge decks to provide reliable threading of a tape along a tape path.

This and other objects are provided by apparatus in accordance with the invention. A threading apparatus is provided for threading a leader block and connected tape from a removable cartridge around a path which includes a READ/WRITE transducer to a takeup reel. The apparatus permits the leader block and tape to be rewound over the tape path into the cartridge permitting removal of the cartridge.

In carrying out the invention according to a preferred embodiment, a cartridge drive and takeup drive assembly is provided having a threading and tape path. The threading path begins at the mouth of the cartridge and ends at the center of the takeup reel. The tape path includes a plurality of bearings for guiding the tape and a READ/WRITE transducer assembly. The takeup reel is provided with an associated drive mechanism for winding and rewinding the tape. The takeup reel is provided with a notch aligned to receive the leader block of the tape. A threading track is disposed, offset outwardly, over the tape path following the same from beginning to end.

A cam follower connected to a longitudinal leader block engaging member is held by a jointed arm assembly in the cam track. One end of the track is positioned with respect to the cartridge mouth so that the leader block is engaged by the leader block engaging member when the cam follower is at this end. Upon rotation of the jointed arm assembly about an axis located within the perimeter of the threading cam track, the leader block engaging member travels from a first end of the track along the threading path to the second end of the cam track, and is positioned over the takeup reel rotational axis. Subsequent rotation of the takeup reel winds the tape about the takeup reel while the leader block remains in the slot connected to the leader block engaging member. During a rewinding operation, the leader block is returned by reverse rotation of the jointed arm assembly, forcing the cam follower to return to the opposite end of the cam track. The leader block at this end of the track is positioned within the mouth of the cartridge permitting the cartridge to be removed from the deck.

Accurate positioning of the engaging arm at each end of the track is provided whereby each cartridge leader block is reliably engaged as the cartridge enters the apparatus, and as the leader block enters the takeup reel slot maintaining the engaging member centered on the takeup reel rotational axis.

DESCRIPTION OF THE FIGURES

FIG. 3 is an illustration of the threading arm mechanism 19 and leader block engaging member 20.

FIG. 4 is an illustration of the takeup reel 14 and cartridge 2 during the threading and dethreading of the leader block.

FIG. 5 illustrates the leader block 2b, with the engaging member 20 and cam follower 22 during winding and rewinding operations.

FIG. 6 is a detailed illustration of the end nests 26 which accurately position the cam follower 22 at the ends of the track 17.

FIG. 7 is another view of the end nests 26 and cam track 17.

FIG. 8 illustrates the positioning of the end nests 26 with respect to the cover 16.

DESCRIPTION OF A PREFERRED EMBODIMENT

Figure 1:
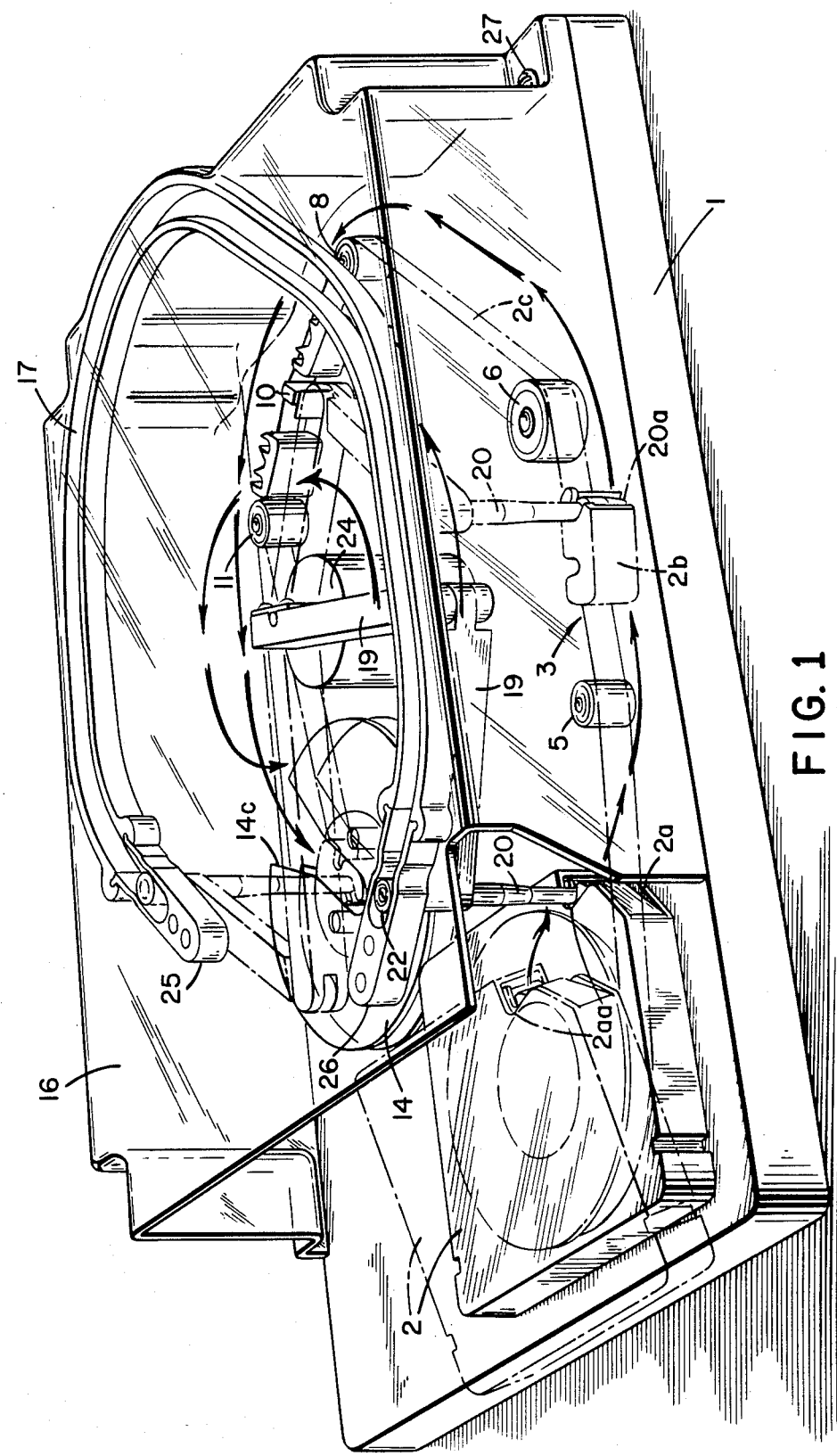
FIG. 1 is an overall plan view of a cartridge tape threading apparatus in accordance with a preferred embodiment of the invention.

Referring now to FIG. 1, there is shown an overall view of the threading apparatus in accordance with a preferred embodiment of the invention. The threading apparatus is associated with a cartridge drive having a base 1 supporting a takeup reel 14 and drive means 14a,b for rotating the takeup reel 14 and cartridge 2. At the beginning of operation, cartridge 2 is positioned along a plane 11° with respect to base 1 so that the narrower portion of leader block engaging member 20 is in alignment with recess 2aa. The cartridge 2 is then lowered against the base 1 and the leader block 2b is engaged with arm 20. The cartridge supports a reel of magnetic tape which can be rotated by conventional drive means to pay out magnetic tape or rewind the tape. The cartridge 2 is shown in its inserted position prior to threading of the tape and leader block associated therewith. Means, not shown but known to those skilled in the art, for retaining the cassette 2 in place during operation of the tape drive are employed to maintain the leading edge of cartridge 2 and its associated opening 2a positioned to receive a leader block engaging member 20. The position of the leader block engaging member 20 is controlled by a cam follower 22 and linkage arm assembly 19. The cam follower 22 resides within a track 17 incorporated in plastic cover 16. The cover 16 bearing the cam track is held to the base by a plurality of screws 27. The cam track follows a tape path 3 which includes a plurality of bearing supports 5, 6, 8 and 11 guiding the tape into communication with a READ/WRITE transducer assembly 10.

Rotation of the arm assembly 19, which is bifurcated into two elements pivotal with respect to each other, pulls the leader block engaging member 20, along a path defined by cam track 17 into a slot 14c in takeup reel 14.

The takeup reel 14 and magnetic tape cartridge 2 are driven by drive means in first and second directions for processing the data contained on the tape. The drive means operates in response to data processing signals for positioning a desired portion of the tape at the READ/WRITE transducer assembly.

The position of leader block engaging arm 20 is sensed at its first and second end positions of travel in cam track 17. The drive signals to gear motor or equivalent 24 which rotate arm assembly 19 in first and second directions, are inhibited when the sensors indicate that the leader block engaging arm is correctly located. Such sensors in this application are previously known, as disclosed in U.S. Pat. No. 4,334,656 and will not be further described.

The leader block engaging member 20 having engaged the leader block of cartridge 2 in a manner to be explained, moves the leader block and tape around a tape path underneath cam track 17 defined by bearing supports 5, 6, 8, 11 and the READ/WRITE transducer assembly 10. Having thus threaded the leader block and tape through the path, the leader block and leader engaging member 20 enter an aligned slot 14c in takeup reel 14. As thus threaded, the takeup reel 14 and cartridge 2 may be wound in first and second directions with the magnetic tape of cartridge 2 to process data stored on the tape.

Figure 2:
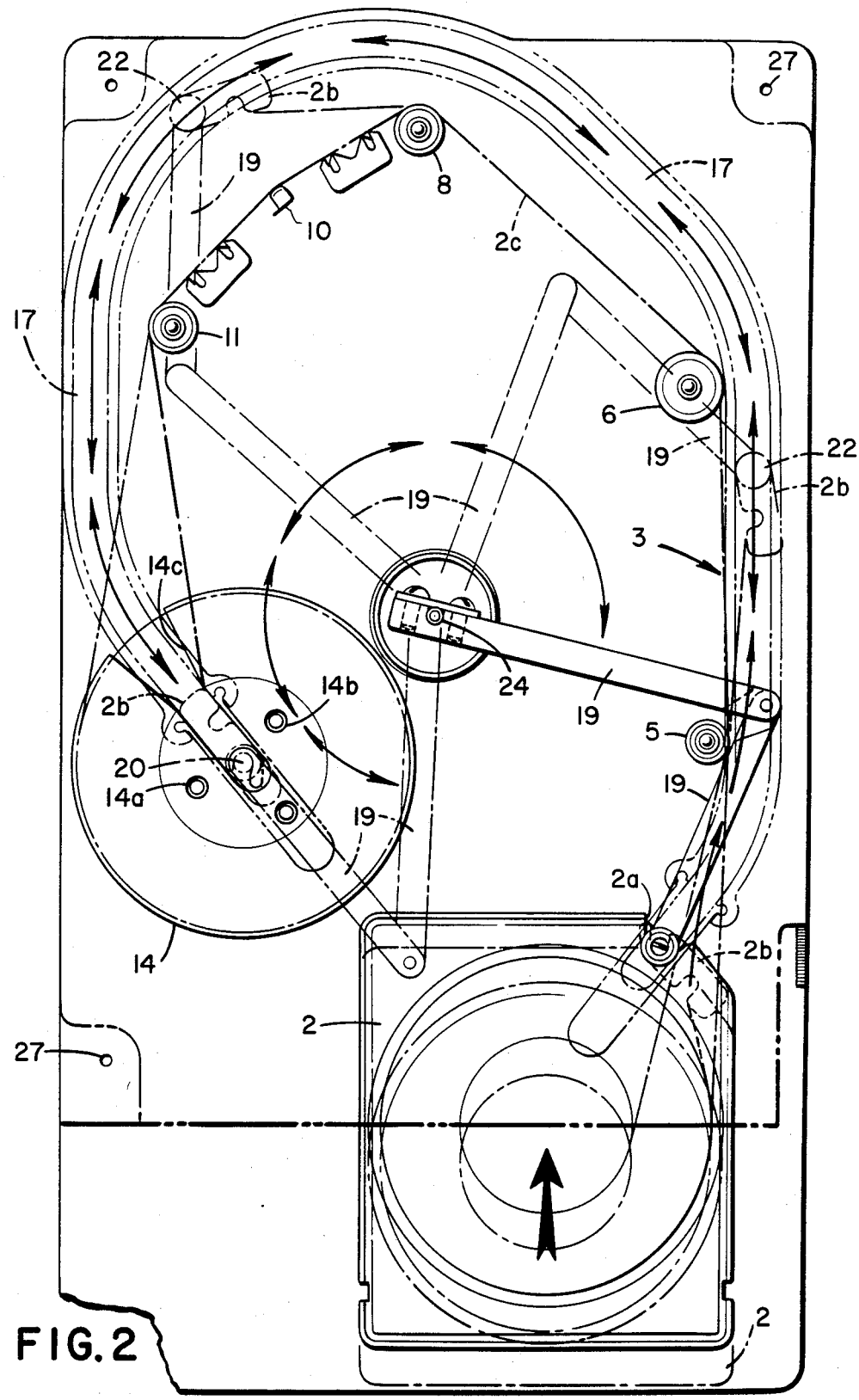
FIG. 2 is a top view of the threading mechanism of FIG. 1.

Referring to FIG. 2, a top view of the threading apparatus is shown in more complete detail. The path 3 is shown having magnetic tape 2c threaded from the cartridge 2 around the perimeter defined by bearings 5, 6, 8, 11 and transducer assembly 10, and terminating in the slot 14c. The leader block 2b for connection with a leader block engaging member 20 is included in an opening 2a in the cartridge 2 forming a mouth at a 45° angle to the adjacent rectangular sides of the cartridge 2. The opening 2a includes a recess 2aa, shown more particularly in FIG. 1, which permits entry of leader block engaging member 20. Thus positioned, the leader block 2b, is positioned to engage an end of the leader block engaging member 20. Once so engaged, the cam track 17 guides leader block engaging member 20 in the direction shown for threading the tape through the path 3 and into slot 14c of the takeup reel 14. Takeup reel 14 rotates with the leader block engaging member 20 coincidental with the rotational axis of takeup reel 14. At the conclusion of data processing operations, the tape is rewound on the cartridge 2 and at the end of the rewind, the linkage arm assembly 19 is rotated in a direction opposite to the threading direction, thereby returning the leader block 2b to its rest position within opening 2a of cartridge 2. Thus returned, the cartridge 2 may be removed from the tape drive.

Referring now to FIG. 4, a more detailed description of the arrangement of the cartridge 2, takeup reel 14 and the leader block engaging member 20 is provided. In FIG. 4, the leader block 2b is shown in its rest position within opening 2a of the cartridge. Leader block 2b includes an opening 2d facing outward through opening 2a. The cartridge 2 is inserted in an upward angle where the opening 2d of leader block 2b slides onto the narrower diameter portion of leader block engaging member 20. The cartridge 2 pivots into a horizontal position, thus sliding opening 2d of leader block 2b down to the larger diametrical portion of leader block engaging member 20 and attaching leader block engaging member 20 to leader block 2b, as shown in FIG. 3. The larger diameter distal end of leader block engaging member 20 is retained by the narrower diameter opening 2d in a larger diameter opening 2e. Thus engaged, the wind and rewind operations may commence. As can be seen more particularly in FIG. 5, the leader block engaging member 20 remains concentric with the rotational axis of the takeup reel 14 until the tape is rewound and leader block engaging member 20 returns the leader block 2b to the cartridge housing 2.

In FIG. 3, the assembly of the arm 19, showing the required pivotal joint 19a, with a gear motor 24 or other drive source for rotating the linkage arm assembly 19 in first and second directions, and the leader block engaging member 20 are shown. The leader block engaging member 20 includes at one end thereof a tapered portion 20a which facilitates the engagement with leader block 2b frontal opening 2d. The frontal opening 2d is narrower in diameter than the distal end of leader block engaging member 20. An aperture 2e concentric with frontal opening 2d receives the distal end 20.

In the foregoing embodiment of the threading apparatus, it is important to reliably and consistently locate the leader block engaging member 20 in its initial end position of track 17 at the proper position for engaging leader block 2b of cartridge 2. Further, it is required at the other end position of track 17 to maintain the leader block engaging member 20 along the axis of rotation of reel 14 whereby the reel can freely rotate with the leader block engaging member 20 still engaged to the leader block 2b.

One means for obtaining the preferred positioning of leader block engaging member 20 at the two end positions of cam track 17 may be seen from FIGS. 6, 7 and 8. In FIG. 8, there are shown two (2) nests 25, 26, terminating the ends of track 17. The nests 26 form extensions to cam track 17 which may be reliably positioned to position the cam follower 22 of leader block engaging member 20 at the first and second ends of travel. At the end of track 17 there is shown, in FIG. 6, first and second ends 17a which form a hinge with ends 26b of the nests 26. The ends 17a include a circular aperture portion which receives a complementary cylindrical portion of nests 26a. When thus inserted, the nests 26 may be angularly positioned at the opposite end until cam follower 22 and its connected leader block engaging member 20 at the end travel positions are accurately positioned. Along a portion of the track extension provided by nests 26 is a restriction 26a. The restriction 26a permits the cam follower 22 to be held within the nest 26 until a sufficient force is applied by arm assembly 19 to pull it back into the cam track 17. When thus applied, the cam roller 22 is forced through restriction 26a entering track 17 for the normal threading operation.

With the nests 25, 26 so installed, it is possible to accurately determine the end points of travel for leader block engaging member 20. When in its first and second end positions, the nests hold the engaging member 20 against further movement until rotation of arm assembly 19 commences. Accurate positioning of this end position is achieved through the hinge formed from track ends 17a and nest ends 26b. Holes for receiving fasteners 33 and 34 may be placed in cover 16, and threaded into apertures 30 and 31 to maintain the thus located nests fixed with respect to the cover 16.

As it is advantageous to accurately locate the ends of travel on cam track 17, the nests 26 have been provided. However, other means, such as an overcentering cam, could be provided to maintain the cam follower 22, and leader block engaging arm 20 in its first and second end positions against appropriately located stops.

The foregoing apparatus permits the track 17 to be molded directly into the cover 16, thus avoiding extra material and labor costs associated with providing a separate track. Further, the bifurcated arm assembly permits gear motor 24 to have a minimum torque over prior art devices having more complicated linkages.

Thus, there has been described with respect to one embodiment an apparatus which can be implemented for threading the leader block and associated tape of a cartridge on a takeup reel in a tape drive assembly. Those skilled in the art will recognize yet other embodiments of the invention described more particularly by the claims which follow.

What is claimed is:

1. A tape drive providing a tape path including a READ/WRITE transducer assembly for processing data on a tape comprising:
   a base member;
   a takeup reel supported for rotation on said base member at the end of said tape path, said takeup reel having a central hub including a slot extending through said takeup reel axis of rotation for receiving a leader block;
   a cover member enclosing said base member, said cover member having an opening for inserting along said base member a magnetic tape cartridge, said cartridge including along a leading edge thereof a frontal opening exposing a leader block;
   a curved cam track located on said cover member facing said base, said cam track beginning at a first end over said cartridge and substantially following said tape path to a second end over said takeup reel;
   first and second nests terminating respective ends of said cam track, said nests having track extension portions connected by hinge means to said track ends which permits said second nest to be angularly adjusted with respect to said takeup reel rotational axis to accurately position the leader block in the takeup reel slot, and permitting said first nest to be angularly adjusted with respect to said cartridge frontal opening, said nests including means for fixing each nest in a respective angular position;
   a longitudinal leader block engaging member having at one end a cam follower for riding in said cam track, and at the remaining end a tapered point for engaging a cutout in said leader block;
   an arm including first and second pivotally connected linkage members, the first of said linkage members connected to be rotated about an axis interior to said curved cam track, the second of said linkage members connected to said leader block engaging member; and
   a drive means for rotating said first linkage member in first and second opposite rotational directions;
   whereby rotation of said first arm linkage member in a first direction forces said cam follower into said first nest engaging said tapered point into said leader block cutout, and rotation of said first arm linkage member in a second direction threads said leader block over said tape path into said takeup reel slot in a position determined by said second nest.

2. The tape drive of claim 1 wherein said longitudinal leader block engaging member is positioned along said takeup reel rotational axis when said cam follower is at said cam track second nest extension.

3. The tape drive of claim 1 wherein said track extensions include along a length thereof a restriction, said restriction maintaining said cam follower positioned against a stop provided by said end nests.

* * * * *